United States Patent [19]
Loechelt, II

[11] Patent Number: 4,576,807
[45] Date of Patent: Mar. 18, 1986

[54] PRODUCTION OF ZEOLITE Y

[75] Inventor: Cecil P. Loechelt, II, Baton Rouge, La.

[73] Assignee: Ethyl Corporation, Richmond, Va.

[21] Appl. No.: 638,246

[22] Filed: Aug. 6, 1984

[51] Int. Cl.$^4$ ............................................. C01B 33/28
[52] U.S. Cl. ..................................... 423/329; 423/328
[58] Field of Search ................... 423/328, 329; 502/79

[56] References Cited

U.S. PATENT DOCUMENTS

| 3,130,007 | 4/1964 | Breck | 423/328 |
|---|---|---|---|
| 3,574,538 | 4/1971 | McDaniel et al. | 423/329 |
| 3,808,326 | 4/1974 | McDaniel et al. | 423/329 |
| 4,016,246 | 4/1977 | Whittam | 423/329 |
| 4,400,366 | 8/1983 | Sanders | 423/329 |
| 4,406,822 | 9/1983 | Sanders et al. | 423/329 X |
| 4,436,708 | 3/1984 | Sanders | 423/329 |
| 4,482,530 | 11/1984 | Sanders et al. | 423/329 |

Primary Examiner—Edward J. Meros
Attorney, Agent, or Firm—Donald L. Johnson; John F. Sieberth; Leonard Paul H.

[57] ABSTRACT

The present invention relates to a process for producing a crystalline synthetic faujasite of the zeolite Y type wherein a relatively small amount of a zeolite Y seed is thoroughly mixed with sodium silicate at ambient temperature to form an activated sodium silicate system and to such activated system, sodium aluminate is added at ambient temperature. The mixture is then heated and reacted with stirring until the desired cyrstalline product is formed. Zeolite Y is filtered out and then dried.

10 Claims, No Drawings

PRODUCTION OF ZEOLITE Y

BACKGROUND OF THE INVENTION

Field of the Invention

In general, the present invention relates to the production of synthetic faujasites, especially zeolites of the zeolite Y type.

Description of the Prior Art

Certain naturally occurring hydrated metal aluminum silicates are called zeolites. Some of these are called faujasites. The synthetic adsorbents of the invention have compositions similar to some of the natural faujasites. The most common of the zeolites are sodium zeolites. Zeolites are useful as detergent builders, cracking catalysts and molecular sieves. Zeolite Y and the zeolite Y of the invention are particularly useful as cracking catalysts.

Zeolites consist basically of a three-dimensional framework of $SiO_4$ and $AlO_4$ tetrahedra. The tetrahedra are atoms cross-linked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion of the crystal of a cation, for example, a sodium ion. This balance may be expressed by the formula $Al/Na=1$. The spaces between the tetrahedra are occupied by water molecules prior to dehydration.

Zeolite Y may be distinguished from other zeolites and silicates on the basis of X-ray powder diffraction patterns and certain physical characteristics. The X-ray patterns for zeolite Y are described hereinafter. Composition and density are among the characteristics which have been found to be important in identifying zeolites.

The basic formula for all crystalline sodium zeolites may be represented as follows:

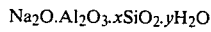

$$Na_2O \cdot Al_2O_3 \cdot xSiO_2 \cdot yH_2O$$

In general, a particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative numbers of these atoms do not significantly alter the crystal structure or physical properties of the zeolite. For zeolite Y, an average value for "x" is about 4.5 with the "x" value falling within the range 4.5+0.5. A molar ratio of $SiO_2$ to $Al_2O_3$ of 4.5 or greater is preferred for cracking catalyst use.

The value of "y" is not necessarily an invariant for all samples of zeolites. This is true because various exchangeable ions are of different size, and since there is no major change in the crystal lattice dimensions upon ion exchange, the space available in the pores of the zeolite to accommodate water molecules varies.

The formula for zeolite Y may be written as follows:

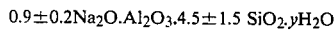

$$0.9 \pm 0.2 Na_2O \cdot Al_2O_3 \cdot 4.5 \pm 1.5\ SiO_2 \cdot yH_2O$$

and wherein "y" may be any value up to 9.

The pores of zeolites normally contain water.

The above formula represents the chemical analysis of zeolite Y. When other materials as well as water are in the pores, chemical analysis will show a lower value of "y" and the presence of other adsorbates. The presence in the crystal lattice of materials volatile at temperatures below about 600° C. does not significantly alter the usefulness of the zeolites as an adsorbent since the pores are usually freed of such volatile materials during activation.

Among the ways of identifying zeolites and distinguishing them from other zeolites and other crystalline substances, the X-ray powder diffraction pattern has been found to be a useful tool. In obtaining X-ray powder diffraction patterns, standard techniques are employed. The radiation is the K doublet of copper, and a Geiger counter or a proportional counter spectrometer with a strip chart pen recorder is normally used. The peak heights, I, and the positions as a function of $2\theta$ where $\theta$ is the Bragg angle, may be read from a spectrometer chart. From these, the relative intensities, $100I/I_o$, where $I_o$ is the intensity of the strongest line or peak, and "d" the interplanar spacing in Angstroms (Å) corresponding to the recorded lines are calculated.

X-ray powder diffraction data for sodium zeolite Y are given in Table A. Relative intensity, $100I/I_o$ and the "d" values in Angstroms (Å) for the observed lines are shown. In a separate column are listed the sum of the squares of the Miller indices $(h^2+k^2+l^2)$ for a cubic unit cell that corresponds to the observed lines in the X-ray diffraction patterns.

TABLE A

X-RAY DIFFRACTION PATTERN FOR SYNTHETIC ZEOLITE Y

| $h^2 + k^2 + l^2$ | d (A) | Relative Intensity |
| --- | --- | --- |
| 3 | 14.29 | 100 |
| 9 | 8.75 | 9 |
| 11 | 7.46 | 24 |
| 19 | 5.68 | 44 |
| 27 | 4.76 | 23 |
| 32 | 4.38 | 35 |
| 40 | 3.91 | 12 |
| 43 | 3.775 | 47 |
| 48 | 3.573 | 4 |
| 51 | 3.466 | 9 |
| 56 | 3.308 | 37 |
| 59 | 3.222 | 8 |
| 67 | 3.024 | 16 |
| 72 | 2.917 | 21 |
| 75 | 2.858 | 48 |
| 80 | 2.767 | 20 |
| 83 | 2.717 | 7 |
| 88 | 2.638 | 19 |
| 91 | 2.595 | 11 |
| 108 | 2.381 | 6 |
| 123 | 2.232 | 2 |
| 128 | 2.188 | 4 |
| 131 | 2.162 | 3 |
| 139 | 2.099 | 5 |
| 144 | 2.062 | 3 |
| 164 | 1.933 | 2 |
| 168 | 1.910 | 3 |
| 179 | 1.850 | 2 |
| 187 | 1.810 | 2 |
| 192 | 1.786 | 1 |
| 195 | 1.772 | 2 |
| 200 | 1.750 | 4 |
| 211 | 1.704 | 5 |

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities.

Thus, the X-ray data given herein to identify the lattice for zeolite Y are not to exclude those materials which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simple test described in "American Mineralogist," Vol. 28, page 545, 1943, permits a quick check of the silicon to aluminum ratio of the zeolite. According to the description of the test, zeolite minerals with a three-dimensional network that contains aluminum and silicon atoms in an atomic ratio of $Al/Si = \frac{2}{3} = 0.67$, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

U.S. Pat. No. 2,882,244 describes a process for making zeolite X comprising preparing a sodium-aluminum-silicate water mixture having an $SiO_2/Al_2O_3$ mole ratio of from 3:1 to 5:1, an $Na_2O/SiO_2$ mole ratio from 1.2:1 to 1.5:1, and an $H_2O/Na_2O$ mole ratio of from 35:1 to 60:1, maintaining the mixture at a temperature of from 20° C. to 120° C. until zeolite X is formed, and separating the zeolite X from the mother liquor.

In U.S. Pat. No. 3,119,659, a kaolin clay and sodium hydroxide are formed into a compact body, dried, reacted in an aqueous mixture at a temperature of from 20° C. to 175° C. until a zeolite is formed. Zeolite X is formed in a reaction mixture having an $Na_2O/SiO_2$ molar ratio of 1.5:1, an $SiO_2/Al_2O_3$ molar ratio of 5:1, and an $H_2O/Na_2O$ molar ratio of 30:1 to 60:1. Zeolite Y is formed in a reaction mixture having an $Na_2O/SiO_2$ molar ratio of 0.5:1, and $SiO_2/Al_2O_3$ molar ratio of 7:1, and an $H_2O/Na_2O$ molar ratio of 20:1 to 40:1.

U.S. Pat. No. 3,920,789 discloses a process for making zeolite Y using elevated temperatures and pressures for the crystallization stage followed by very rapid cooling of the reaction mass.

In U.S. Pat. No. 3,130,007, zeolite Y is formed by preparing an aqueous sodium alumino silicate mixture having a certain composition, maintaining the mixture at a temperature of 20° C. to 125° C. until zeolite Y is formed, and separating the zeolite Y from the mother liquor.

In U.S. Pat. No. 4,016,246, zeolite Y is formed by preparing an aqueous alumino silicate reaction mixture by mixing an alumina component and an $Na_2O$ component with an active hydrate sodium metasilicate to form a certain reaction mixture, then heating the mixture at a temperature of 20° C. to 120° C. until zeolite Y is formed.

U.S. Pat. No. 4,166,099 discloses a process for preparing crystalline aluminosilicate zeolites, particularly synthetic faujasites such as zeolite Y type, utilizing especially prepared amorphous aluminosilicate nucleation centers or seeds having an average particle size below about 0.1 micron. The latter are prepared by vigorously mixing at a temperature of 35° C. or less a mixture having a molar composition of 13–17 $Na_2O$, 1 $Al_2O_3$, 12–16 $SiO_2$ and 300–400 $H_2O$ and then aging the mixture for two hours or more at 25° C. or less. The mixture of seed and alkaline reaction mixture of alumina and silica is reacted at a temperature of about 60°–150° C. for a period of time sufficient to produce a crystalline zeolite Y.

U.S. Pat. No. 4,164,551 discloses a process for making zeolite Y also utilizing specifically prepared nucleating centers.

U.S. Pat. No. 4,400,366 discloses a process for making a crystalline synthetic faujasite of the zeolite Y type of an exceptionally high crystallinity using a seed quantity of zeolite Y. Such process requires mixing of reactants at a temperature up to about 0° C. and aging period of up to about 16 hours. U.S. Pat. No. 4,436,708 is a modification of such latter process wherein smaller amounts of water are utilized.

Zeolites are useful as molecular sieves and as sequestering agents for calcium and magnesium cations. They are particularly useful in detergent or washing compositions.

One of the primary uses of "Y" type zeolites is as a fluid catalytic cracking catalyst component.

It is a primary object of the present invention to provide a synthetic faujasite of the zeolite Y type which can be prepared using seed quantities of zeolite Y and mixing the reactants at ambient temperature.

It is an important object of the present invention to provide a process for making synthetic zeolite Y which eliminates the necessity of carrying out the reaction at cold temperatures and long aging times.

Another object of the present invention is to provide a simpler and more economical process for making zeolite Y particles using a bulk crystalline seed process.

SUMMARY OF THE INVENTION

The present invention is directed to the preparation of a synthetic faujasite, namely zeolite Y, wherein a relatively small amount of zeolite Y as a seed is mixed at ambient temperatures with a sodium silicate solution and a sodium aluminate solution, with agitation in amounts and conditions to provide a sodium alumina silicate reaction mixture. The mixture is then heated and reacted with stirring until the desired crystalline product is formed. Zeolite Y is filtered out and then dried.

DESCRIPTION OF THE PREFERRED EMBODIMENTS

Zeolite X and zeolite Y are names given to synthetic zeolites having the crystal structure of the naturally occurring mineral, faujasite. Zeolite X is the name for those compounds having an $SiO_{2/Al_2O_3}$ ratio of less than 3 while zeolite Y is the name for those compounds with a ratio of 3 or greater. Zeolite Y is known to have ratios upwards to 7 but those with $SiO_2/Al_2O_3$ in the range of about 4.5 to 5.5 are of greatest importance.

The invention comprises a method of preparing crystalline aluminosilicates of the zeolite Y type which involves seeding a reaction mixture of sodium silicate and sodium aluminate with a small amount of bulk zeolite Y obtained from a previous process. The seed provides up to about ten percent of $Al_2O_3$ in final product.

The seed is a relatively small quantity of finely powdered zeolite Y, preferably having a particle size less than about 10 microns, from a previously prepared bulk product. Larger particles may also be suitable, but are generally undesirable in the finished product.

In general, a sodium silicate solution and a sodium aluminate solution are each separately prepared. Any suitable process for preparing the sodium silicate solution and the sodium aluminate solution may be used.

An activated sodium silicate system is prepared by mixing a relatively small amount of the finely ground dry seed or bulk zeolite of the zeolite Y type with a sodium silicate solution at ambient temperature and then cooking the mixture at approximately 100° C. for about four hours. The mixture or system is then cooled to ambient temperature.

Dry zeolite Y may be used in amounts of about four percent to ten percent by weight of the final expected product. The amount of seed zeolite Y used is not critical other than that it should be a sufficient amount to provide the necessary activation of the sodium silicate system. About four percent appears to be the minimum amount to do this. Larger amounts may be used since the zeolite Y is in the final zeolite Y product, but obviously, the economics diminish as larger quantities are used.

The mixture of seed zeolite Y and sodium silicate provides a suitable activated system. Activation is accompanied by agitation, with stirring being adequate. Agitation is continued at a temperature of about 100° C. up to about four hours or more. Longer times may be used if desired, but should be unnecessary. Temperature and times may be varied somewhat, but the activation period or mixing of bulk or seed zeolite Y with sodium silicate must be at ambient or higher temperatures.

A sodium aluminate solution is independently prepared, cooled to ambient temperature and then slowly added with agitation to the sodium silicate-seed mixture or system. While mixing, the temperature of the system is maintained at or near ambient temperature.

The reaction mixture comprises a sodium silicate mother liquor and an amorphous sodium alumino silicate pigment and for zeolite Y, the mixture has a molar ratio of $6.6 \pm 0.5 Na_2O.Al_2O_3.17.5 \pm 0.5 SiO_2.135 \pm 5 H_2O$.

After addition of the sodium aluminate is completed, agitation may be stopped and the reaction mixture is then cooked at about 100° C. for about 24 hours. The mixture is then cooled to less than 80° C.

Reaction mixtures having molar ratios about as follows are suitable:
$Na_2O$ to $Al_2O_3$—5.0 to 8.5
$SiO_2$ to $Al_2O_3$—15.0 to 25.0
$H_2O$ to $Al_2O_3$—100 to 180.

After cooling, the reaction mixture is filtered. The filter cake is washed and dried to produce a zeolite Y product having a high crystallinity and a silica to alumina ratio in excess of 4.5.

Having described the basic aspects of the present invention the following examples are given to illustrate specific embodiments thereof.

Equipment

The reactions were made in standard laboratory glass distilling vessels. A 3-neck, 1-liter, round-bottom flask with stirrer, heating mantle and thermometer was suitable. Agitation was supplied by a glass stirring rod with Teflon blades attached to an electric motor. Heat was supplied by an electric heating mantle attached to a Variac. The products were filtered using a Buchner funnel with filter paper and dried in a 100° C. oven.

Reagents

Zeolite Y seed—Linde LZ-Y52 having mole ratio of $Na_2O.Al_2O_3.4.7SiO_2. 7H_2O$
Sodium aluminate—commercial sodium aluminate with an average of 17.5 percent $Na_2O$, 21.5 percent $Al_2O_3$ and 61.0 percent $H_2O$
Sodium silicate—commercial sodium silicate with 9.1 percent $Na_2O$, 29.3 percent $SiO_2$ and 61.6 percent $H_2O$
Sodium hydroxide—commercial sodium hydroxide
Water—distilled water.

EXAMPLE 1

An activated sodium silicate system was prepared by thoroughly mixing 348.7 grams of sodium silicate with 5.9 grams of zeolite Y seed at ambient temperature, heating to reflux and then cooking at around 100° C. for four hours. The system was then cooled to ambient temperature (25° C.). A reaction mixture was prepared by thoroughly mixing 42.7 grams of sodium aluminate with the activated sodium silicate system. The reaction mixture had a molar ratio of $6.4Na_2O:1Al_2O_3:17.5SiO_2:135H_2O$. The reaction mixture was heated to reflux (100° C.) and held for 24 hours with stirring. The mixture was cooled to less than 80° C. and the contents of the flask filtered in a Buckner funnel and washed with water until the filtrate had a pH of about 9. The solids were dried in an oven at 105° C. The solids product was analyzed by X-Ray Diffraction (XRD) and found to be 83 percent zeolite Y with a silica to alumina molar ratio of 5.0.

EXAMPLE 2

The procedure of Example 1 was carried out except that molar ratios of the reaction mixture were varied somewhat. One run had a cook time of 16 hours and seed of percent alumina of 26.5. XRD analysis revealed a zeolite Y product having an average yield of zeolite Y of 68 percent and a silica to alumina ratio of 4.7 to 5.3. The results are shown in Table I hereinafter.

TABLE I

| RUN NO. | MOLE RATIOS | | | | COOK HOURS | SEED CONC. % $Al_2O_3$ | PRODUCT | |
|---|---|---|---|---|---|---|---|---|
| | $Na_2O$ | $Al_2O_3$ | $SiO_2$ | $H_2O$ | | | % Y | $SiO_2/Al_2O_3$ |
| 1 | 6.3 | 1 | 18.1 | 159 | 24 | 10 | 40 | 5.1 |
| 2 | 6.1 | 1 | 17.5 | 137 | 24 | 10 | 77 | 4.7 |
| 3* | 8.0 | 1 | 23.6 | 171 | 16 | 26.5 | 62 | 4.9 |
| 4 | 6.5 | 1 | 17.6 | 134 | 24 | 10.0 | 63 | 5.3 |
| 5 | 6.6 | 1 | 17.5 | 137 | 24 | 10.0 | 69 | 5.1 |
| 6 | 6.6 | 1 | 17.5 | 137 | 24 | 10.0 | 83 | 5.0 |
| 7 | 3.2 | 1 | 6.0 | 100 | 18 | 4.5 | 0 | — |
| 8 | 6.6 | 1 | 17.5 | 135 | 16 | 4.5 | 23 | — |
| 9* | 6.4 | 1 | 18.8 | 145 | 16 | 4.7 | 37 | — |
| 10* | 5.2 | 1 | 17.5 | 136 | 16 | 4.5 | 16 | — |

TABLE I-continued

| RUN NO. | MOLE RATIOS | | | | COOK HOURS | SEED CONC. % Al$_2$O$_3$ | PRODUCT | |
|---|---|---|---|---|---|---|---|---|
| | Na$_2$O | Al$_2$O$_3$ | SiO$_2$ | H$_2$O | | | % Y | SiO$_2$/Al$_2$O$_3$ |
| 11* | 6.5 | 1 | 17.6 | 137 | 24 | 10.0 | 40 | — |

Note: No determination was made of product ratios in Runs 7-11.
*Some Sodium silicate had the following composition: 13.4 Na$_2$O. 24.1 SiO$_2$. 62.5 H$_2$O Substantial yields of synthetic crystalline zeolite Y may be rapidly and efficiently obtained using ambient temperatures.

Although the temperatures and times stated herein are preferred, some variations may be made within the abilities of those skilled in the art without substantially effecting the process or product.

The foregoing disclosure and description of the invention is illustrative and explanatory thereof and various changes in the illustrated process may be made within the scope of the appended claims without departing from the spirit of the invention.

What is claimed is:

1. A method of producing crystalline synthetic faujasite, comprising the steps of separately preparing a sodium silicate solution and a sodium aluminate solution, providing an activated sodium silicate system by mixing said sodium silicate solution at ambient temperature with finely ground dry seed synthetic faujasite of the zeolite Y type product desired in an amount of about four percent of the final product and then cooking at about 100° C. for about four hours or more, cooling the activated sodium silicate system to about ambient temperature, mixing the sodium aluminate solution with the activated sodium silicate system at ambient temperature to provide a reaction mixture having a molar ratio of (5.0–8.5)Na$_2$O.Al$_2$O$_3$.(15.0–25.0)SiO$_2$. (100–180)H$_2$O, heating the reaction mixture to about 100° C. for about twelve hours or more with agitation until the desired crystalline synthetic faujasite is formed, and recovering said faujasite.

2. The method of claim 1 wherein the seed faujasite of the zeolite Y type is added in an amount of about 4% to 10% by weight of the final product.

3. The method of claim 1, wherein the total mixture has the following molar ratio:

$$6.6\pm0.5 Na_2O.Al_2O_3.17.5\pm0.5 SiO_2.135\pm5 H_2O$$

4. The method of claim 1, wherein agitation is by stirring.

5. A method of preparing a crystalline zeolite Y, comprising the steps of
    (a) mixing at ambient temperature a sodium silicate solution with finely ground dry seed of zeolite Y in an amount of at least about four percent by weight of the expected product;
    (b) cooking the mixture at 100° C. for about four hours to provide an activated sodium silicate system;
    (c) cooling the activated sodium silicate system to ambient temperature;
    (d) adding a sodium aluminate solution to the activated sodium silicate system with stirring to produce a reaction mixture having a sodium oxide to alumina molar ratio about 5.0 to 8.5, a silica to alumina molar ratio of about 15.0–25.0, and a water to alumina molar ratio of about 100–180;
    (e) cooking the mixture 100° C. for about 12 to about 24 hours;
    (f) filtering, washing, drying and recovering the crystalline zeolite Y.

6. The method of claim 5 wherein the seed amount of zeolite Y is about four percent to ten percent by weight of the expected product.

7. The method of claim 5, wherein the temperature of step (a) is about 25° C.

8. The method of claim 5, wherein after step (e) and before step (f), the reaction mixture is cooled.

9. The method of claim 5, wherein the temperature of step (c) is about 15° C.–35° C.

10. The method of claim 5, wherein the temperature of step (c) is about 25° C.

* * * * *

UNITED STATES PATENT AND TRADEMARK OFFICE
CERTIFICATE OF CORRECTION

PATENT NO. : 4,576,807
DATED : MARCH 18, 1986
INVENTOR(S) : CECIL P. LOECHELT II

It is certified that error appears in the above-identified patent and that said Letters Patent is hereby corrected as shown below:

Abstract, line 8, " cyrstalline " should read -- crystalline --.

Column 1, lines 23-24, " O(Al + Si) = 2 " should read -- O/(Al + Si) = 2 --.

Column 1, line 50, " 4.5 + 0.5 " should read -- 4.5 $\pm$ 0.5 --.

Signed and Sealed this

Twenty-ninth Day of July 1986

[SEAL]

Attest:

Attesting Officer

DONALD J. QUIGG

Commissioner of Patents and Trademarks